United States Patent [19]

Negi et al.

[11] 4,245,328
[45] Jan. 13, 1981

[54] BINARY CODED DECIMAL CORRECTION APPARATUS FOR USE IN AN ARITHMETIC UNIT OF A DATA PROCESSING UNIT

[75] Inventors: Virendra S. Negi, Pepperell; Arthur Peters, Sudbury, both of Mass.

[73] Assignee: Honeywell Information Systems Inc., Waltham, Mass.

[21] Appl. No.: 735

[22] Filed: Jan. 3, 1979

[51] Int. Cl.³ .................................................. G06F 7/50
[52] U.S. Cl. ...................................................... 364/771
[58] Field of Search .................... 364/772, 771 V, 771

[56] References Cited

U.S. PATENT DOCUMENTS

| | | | |
|---|---|---|---|
| 3,089,644 | 5/1963 | Wensley | 364/771 |
| 3,806,719 | 4/1974 | Yamamura et al. | 364/772 |
| 3,809,872 | 5/1974 | Yamamura et al. | 364/772 |
| 3,935,438 | 1/1976 | Grupe | 364/771 |
| 3,958,112 | 5/1976 | Miller | 364/771 X |
| 4,001,567 | 1/1977 | Simone | 364/771 |
| 4,001,570 | 1/1977 | Gooding et al. | 364/771 |
| 4,125,867 | 11/1978 | Cochran | 364/772 |

*Primary Examiner*—David H. Malzahn
*Attorney, Agent, or Firm*—John S. Solakian; Nicholas Prasinos; Ronald T. Reiling

[57] ABSTRACT

Binary coded decimal operands may be operated on by use of a binary arithmetic logic unit and the result corrected to provide a binary coded decimal result by use of correction logic which is responsive to the result produced by the binary arithmetic logic unit, the type of operation being performed and whether the binary arithmetic logic unit produced a carry as a result of its arithmetic operation on such operands.

9 Claims, 9 Drawing Figures

| LOCATION | DEC. SUB. OR BINARY MODE ADD = 0 OPERATION TYPE SUB = 1 OR BINARY MODE | (DECIMAL) OR BINARY MODE CARRY | ALU 0 | ALU 1 | ALU 2 | REMARKS | CARRY OUT (DECIMAL) | OUTPUT DGIT BIT 0 | 1 | 2 | DIGIT < 2 |
|---|---|---|---|---|---|---|---|---|---|---|---|
| | 1 | 2 | 3 | 4 | 5 | | | | | | |
| 1 | 0 | 0 | 0 | 0 | 0 | OUTPUT = 0 OR 1 | 0 | 0 | 0 | 0 | 1 |
| 2 | | | 0 | 0 | 1 | | 0 | 0 | 0 | 1 | 0 |
| 3 | | | 0 | 1 | 0 | | 0 | 0 | 1 | 0 | 0 |
| 4 | | | 0 | 1 | 1 | BCD ADD WITH | 0 | 0 | 1 | 1 | 0 |
| 5 | | | 1 | 0 | 0 | NO CARRY | 0 | 1 | 0 | 0 | 0 |
| 6 | | | 1 | 0 | 1 | | 1 | 0 | 0 | 0 | 1 |
| 7 | ↓ | ↓ | 1 | 1 | 0 | RESULT > 9 - DO CORRECTION | 1 | 0 | 0 | 1 | 0 |
| 8 | | | 1 | 1 | 1 | | 1 | 0 | 1 | 0 | 0 |
| 9 | 0 | 1 | 0 | 0 | 0 | 0 OR 1 → 16 OR 17 | 0 | 0 | 1 | 1 | 0 |
| 10 | | | 0 | 0 | 1 | 2 OR 3 → 18 OR 19 | 0 | 1 | 0 | 0 | 0 |
| 11 | | | 0 | 1 | 0 | | | | | | |
| 12 | | | 0 | 1 | 1 | DECIMAL ADD AND | | | | | |
| 13 | | | 1 | 0 | 0 | CARRY OUT | | | | | |
| 14 | | | 1 | 0 | 1 | ILLEGAL | | | | | |
| 15 | | | 1 | 1 | 0 | OUTPUT | | | | | |
| 16 | ↓ | ↓ | 1 | 1 | 1 | | | | | | |
| 17 | 1 | 0 | 0 | 0 | 0 | | | | | | |
| 18 | | | 0 | 0 | 1 | | | | | | |
| 19 | | | 0 | 1 | 0 | | | | | | |
| 20 | | | 0 | 1 | 1 | DEC. SUB. 7 → 1 | 0 | 0 | 0 | 0 | 1 |
| 21 | | | 1 | 0 | 0 | AND 8,9 → 2,3 | 0 | 0 | 0 | 1 | 0 |
| 22 | | | 1 | 0 | 1 | NO CARRY A,B → 4,5 | 0 | 0 | 1 | 0 | 0 |
| 23 | | | 1 | 1 | 0 | C,D → 6,7 | 0 | 0 | 1 | 1 | 0 |
| 24 | ↓ | ↓ | 1 | 1 | 1 | E,F → 8,9 | 0 | 1 | 0 | 0 | 0 |
| 25 | 1 | 1 | 0 | 0 | 0 | | 0 | 0 | 0 | 0 | 1 |
| 26 | | | 0 | 0 | 1 | | 0 | 0 | 0 | 1 | 0 |
| 27 | | | 0 | 1 | 0 | DEC. SUB. | 0 | 0 | 1 | 0 | 0 |
| 28 | | | 0 | 1 | 1 | AND CARRY NO CORRECTION | 0 | 0 | 1 | 1 | 0 |
| 29 | | | 1 | 0 | 0 | OR | 0 | 1 | 0 | 0 | 0 |
| 30 | | | 1 | 0 | 1 | BINARY OPERATION | 0 | 1 | 0 | 1 | 0 |
| 31 | | | 1 | 1 | 0 | | 0 | 1 | 1 | 0 | 0 |
| 32 | ↓ | ↓ | 1 | 1 | 1 | | 0 | 1 | 1 | 1 | 0 |

INPUT ADDRESS (columns 3, 4, 5)

FIG. 9

BINARY CODED DECIMAL CORRECTION APPARATUS FOR USE IN AN ARITHMETIC UNIT OF A DATA PROCESSING UNIT

RELATED APPLICATIONS

The following applications are incorporated by reference to the instant application.

1. "Control File Apparatus for a Data Processing System" invented by Virendra S. Negi and Arthur Peters, filed on even date herewith and having Ser. No. 000,733 and assigned to the same assignee named herein.

2. "Arithmetic Logic Apparatus for a Data Processing System" invented by Virendra S. Negi and Arthur Peters, filed on even date herewith and having Ser. No. 000,842 and assigned to the same assignee named herein.

3. "Control Store Address Generation Logic for a Data Processing System" invented by Arthur Peters and Virendra S. Negi, filed on even date herewith and having Ser. No. 000,864 and assigned to the same assignee named herein.

BACKGROUND OF THE INVENTION

The present invention generally relates to data processing systems and more particularly to arithmetic logic which is used therein.

When performing arithmetic operations in a data processing system, the operands being operated upon are in a binary form or in binary coded decimal form. For example, the number 13 in binary form would be expressed in binary ones and zeros as 1101, whereas in binary coded decimal form it would be expressed as 0001 0011. It can be seen that for the binary coded decimal number, the least significant number of the number 13, i.e., the number 3, is expressed in the right most four ones and zeros and the most significant number 1 of the number 13 is expressed in the left most combination of ones and zeros. In order to minimize cost, such data processing systems sometimes include only a single arithmetic unit for performing operations on such operands. In the case where a binary arithmetic logic unit is utilized, binary operands are operated upon in a conventional manner. However, for the case where binary coded decimal numbers must be operated upon by use of a binary arithmetic logic unit, the result produced by such binary arithmetic logic must be corrected in order to produce the correct result. This has been accomplished in the prior art by use of the well-known excess six correction technique. One implementation of such excess six correction technique is shown in block diagram form in FIG. 6 hereof. It can be seen from further reading herein, that such excess six correction technique of the prior art requires logic for one operand wherein a conditional add operation takes place, and second logic coupled to the output of the binary arithmetic logic unit wherein a conditional subtract operation may take place. It has been found that the use of such logic in such implementation is costly in that increased logic is required. In addition, such logic requires additional physical space which is not desirable, particularly as processors become more and more integrated on, for example, a single circuit board.

It is, accordingly, a primary object of the present invention to provide a data processing system having an improved apparatus for correcting the result produced by a binary arithmetic logic unit when operating upon two operands in binary coded decimal form.

SUMMARY OF THE INVENTION

The above stated object and other objects are achieved according to the present invention by providing apparatus for performing binary coded decimal arithmetic by use of an arithmetic logic unit designed for performing binary arithmetic, wherein such apparatus includes a binary arithmetic logic unit for performing binary arithmetic on a first operand and a second operand and thereby producing a result, wherein the first and second operands are in binary coded decimal form. Apparatus is provided for indicating whether the arithmetic operation to be performed by the arithmetic logic unit is an add operation or a subtract operation, and, in addition, further apparatus provided for determining whether the result of the arithmetic operation on the first and second operand has produced a carry output. Correction logic is also provided, which correction logic is responsive to the result produced by the binary arithmetic logic unit, as well as the type of arithmetic operation and whether or not a carry output was produced, for providing a corrected result in binary coded decimal form.

BRIEF DESCRIPTION OF THE DRAWINGS

The above and other objects of the present invention are achieved in the illustrative embodiment as described with respect to the Figures in which.

DETAILED DESCRIPTION OF THE PREFERRED EMBODIMENT(S)

Figure 1:
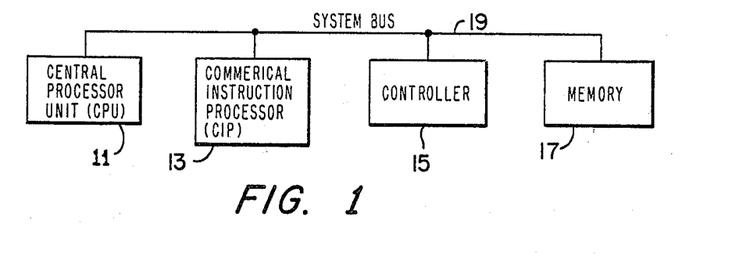
FIG. 1 illustrates the overall system configuration which incorporates the present invention.

The purpose of the CIP 13 is to expand the CPU 11, shown in the system configuration of FIG. 1, instruction set capabilities by using a powerful set of commercial type instructions. These instruction types allow the CPU, via the CIP, to process decimal and alphanumeric data; the instruction types are listed as follows: Decimal, Alphanumeric, Data Conversion and Editing. CIP communication with the CPU and main memory 17 is over a common system bus 19. The CIP operates as an attachment to the CPU and receives instructions and operands as transfers from the CPU and/or memory. The CIP executes the commercial instructions as they are sent over the bus 19 by the CPU 11. The CPU obtains these instructions from main memory, examining each fetched instruction specifically for a commercial instruction. Receipt of each commercial instruction by the CIP is usually concurrent with the CPU, as the CPU extracts and decodes each instruction from memory. However, CIP instruction execution is asynchronous with CPU operations. Any attempt to execute a commercial instruction when a CIP is not installed in the system causes the CPU to enter a specific trap condition.

The CIP receives information from the CPU and main memory via the bus 19, and processes this information in a logical sequence. This sequence consists of four CIP operational states as follows: idle state, load state, busy state and trap state.

Figure 2:
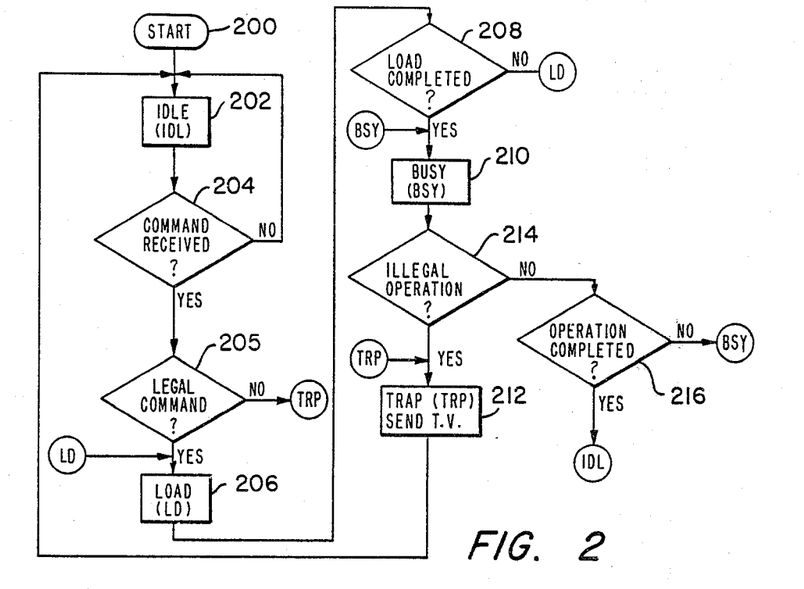
FIG. 2 is an operational sequence state diagram of the processor of the present invention.

As shown in FIG. 2, the CIP enters block 200 and remains in the idle state (block 202) when not processing information, and must be in the idle state to accept a command (i.e., a CIP instruction or an I/O command) from the CPU. On receipt of a command (block 204), if legal (block 205), the CIP enters the load state (block 206) and remains in the load state until all associated command information is received. When this information is successfully received (block 208), the CIP enters the busy state (block 210) to process the information. Any further attempts by the CPU to communicate with the CIP while in its busy state are not acknowledged by the CIP until it returns to the idle state again. CIP processing includes the communication activity with main memory that occurs when fetching the necessary operand(s). The CIP enters the trap state (block 212) only when specific illegal events occur (block 214), such as detection of an illegal operand length or an out of sequence command. Return is made to the idle state if the operation has been completed (block 216).

All pertinent instruction transfers to the CIP are performed jointly by the CPU and CIP. They are decoded and sent by the CPU to the CIP along with all of the pertinent information required for execution of the instruction. When the transfer of the information is completed, the CPU and CIP continue to process their respective instructions. Each CIP instruction contains a 16-bit wide instruction word that is immediately followed with up to six additional descriptive type words (also 16-bits wide), called data descriptors and labels. The instruction word contains the CIP op-code that is sent to the CIP for processing. The data descriptors describe the operand type, size, and location in memory; the label provides the address of a remote data descriptor. Both the data descriptor and the label are processed by the CPU; related information derived by this action, such as an operand type and memory address, is sent to the CIP for processing. The CPU accomplishes the preceding by analyzing the op-code that is contained in each instruction. When the CPU detects a CIP instruction (i.e., if the CIP is in the idle state), the CPU sends the instruction op-code and the related information in the following manner: (i) The CPU sends the op-code (i.e., the first word of the commercial instruction) to the CIP. The CIP enters the load state when it accepts the op-code; (ii) The CPU fetches the first data descriptor and interrogates the address syllable to generate the effective address; (iii) The CPU sends the following information: the 24-bit effective byte address of the first operand, the contents of the pertinent CPU data register, if applicable, and the data descriptor of the first operand, updated to reflect a byte (eight bits) or half-byte (four bits) digit position within a word; and as second and third operand are encountered, the CPU performs the applicable procedures in steps ii and iii.

At this point, the CIP is loaded with all of the necessary information required to execute the commercial instruction and enters the busy state to execute the instruction. When necessary, the CIP communicates directly with main memory to obtain the applicable operand(s). However, it should be noted that the CIP never directly accesses any CPU registers. It only uses information sent to it by the CPU. Hence, no CPU registers are modified by the CIP and the CPU continues to process the next and each succeeding CPU instruction until one of the following conditions occurrs: (i) The CIP, via a trap vector (TV), notifies the CPU that an illegal event occurred during the execution of the current commercial instruction; or (ii) an internal or external interrupt signal is detected by the CPU.

When an interrupt signal is detected by the CPU, the CPU performs the following. The CPU determines whether or not the last commercial instruction was completed by the CIP. The CPU waits for completion of the last commercial instruction. When the last commercial instruction is completed, the CPU determines if it resulted in a trap request. If it did, the CPU honors the trap request before performing the interrupt. This results in a typical context save/restore operation to store all relevant CPU and CIP status information, as required. With the completion of the CPU operations required to process a CIP trap request, or when there is no trap request and a CIP instruction is available for processing, the CPU performs the following. The CPU updates its program counter to point to the commercial instruction it was attempting to initiate. The CPU defers the attempt to process the commercial instruction until the current interrupt is serviced. The CPU honors and services the interrupt caused by the external device.

As the CIP executes an instruction, all CPU registers, including those referenced by the current commercial instruction, can be altered by a program via CPU instructions. However, the software must not modify the operand for a commercial instruction until the CIP is through processing that instruction; otherwise, unspecified results will occur. Branch instructions included in the CIP instruction repertoire are executed synchronously by the CPU and the CIP.

The three types of data that make up the data words processed by the CIP are Alphanumeric Data, Binary Data and Decimal Data. Each data type is classified into units of binary information. By definition this unit, when used to reference alphanumeric and binary data characters equals eight bits (one byte); when used to reference decimal data characters, it equals four bits (half byte) for packed decimal data and eight bits (one byte) for string decimal data. Also, single precision binary numbers consist of two units (two bytes) and double precision binary numbers consist of four units (four bytes).

Figure 3:
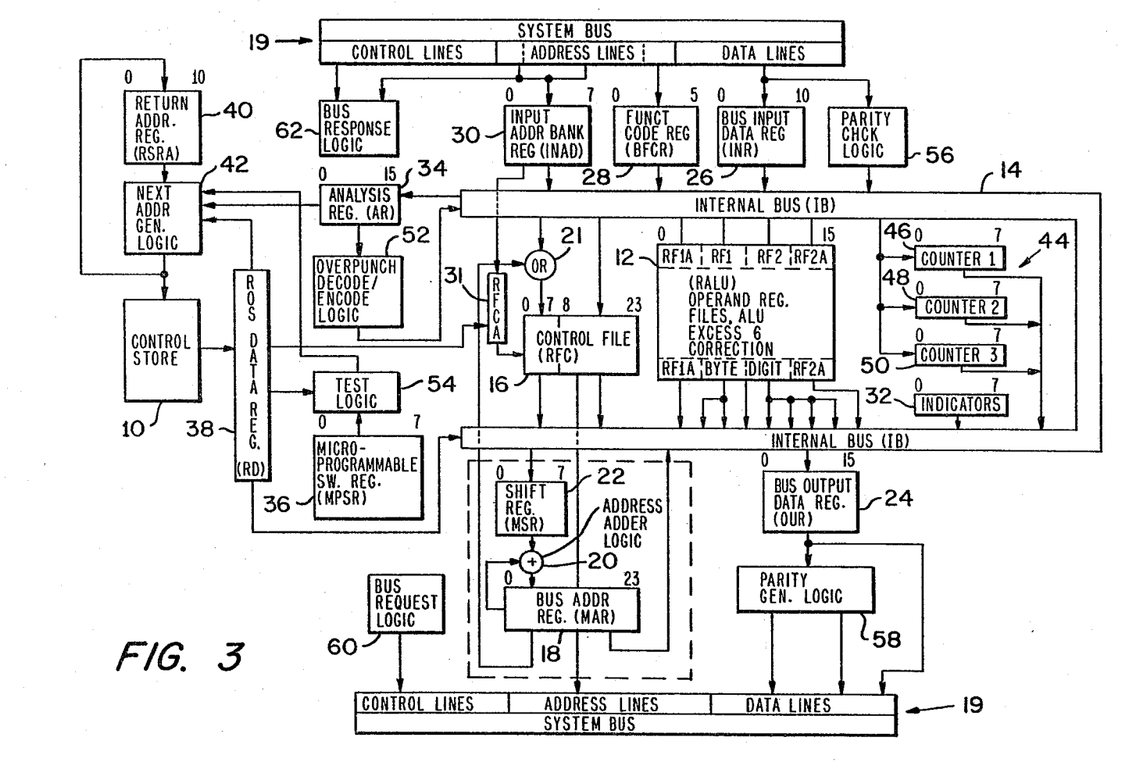
FIG. 3 is a block diagram of the processor of the present invention.

FIG. 3 is a major block diagram of the commercial instruction processor 13 of the present invention, showing all of the major data transfer paths between the processor's registers.

The control storage 10 is comprised of a plurality of locations, one for each control store or firmware word. These firmware words directly or indirectly control the processor sequences, data transfer paths, and bus operations.

The operand register files and arithmetic logic unit (RALU) 12 primarily includes two register files, an arithmetic logic unit (ALU) and the associated multiplexers and control registers. Included in the RALU 12 are the operand register files (RF1 and RF2), each containing sixteen sixteen bit locations that are used to buffer operands for execution in the ALU. The ALU input multiplexers and latches are comprised of the following: three 2-to-1 multiplexers (zone selection), two 4-to-1 multiplexers (digit selection), and two 8-bit latches (byte latches). These multiplexers and latches are used to deliver data from the operand register files to the ALU. Data can also be transferred from the current product counter to the left side of the ALU or from operand register file 2 to the multiply register. The 8-bit ALU (which is comprised of two 4-bit ALU chips, a carry look-ahead chip, and a carry in/carry out flip-flop) is capable of performing the following operations between the left (1) and right (2) inputs: Binary Add, Binary Subtract Input 1 from Input 2, Binary Subtract Input 2 from Input 1, Logical OR, Logical AND, Exclusive OR, Set ALU Output Equal to FF, and Clear ALU Output to 00. The RALU is discussed in detail with respect to FIG. 5.

The excess 6 (XS6) correction logic of the RALU is enabled whenever the ALU is in decimal mode, and is used to change the binary output from the adder to the correct decimal digit while modifying the carry output for subsequent operations. XS6 correction is accomplished by using a 32-bit by 8-bit PROM chip, which encodes the corrected three high-order bits of the digit and generates the corrected carry. A digit less than two function is also available on the output of the PROM chip for other controls. The ALU output multiplexer is used to feed either the upper four bits of the adder output or the correct decimal zone bits to the internal bus 14, depending on whether the ALU is operating in binary or decimal mode, respectively. The RALU control logic consists of three registers, which are as follows: RF1A - Register File 1 Address Register, RF2A - Register File 2 Address Register and ALMR - ALU Mode Control Register. These registers, in conjunction with several microinstructions, control all operations within the RALU. Besides the registers and control described previously, there are two other registers that are classified as RALU registers. These registers are the current product counter (CPRC) and the multiplier register (MIER), to be discussed hereinafter.

The control file 16, also referred to as register file C (RFC), is a 16 location by 24 bit RAM that is primarily used to store all instruction related information that originates from the CPU 11 (e.g., task words, data descriptors, effective addresses, etc.). The control file also contains several work locations which are used by the processor (CIP) firmware. The control file 16 receives bits 0–7 from either internal bus 14 or bus address register (MAR) 18 via OR logic multiplexer 21. The bus address register (MAR) 18 and address adder logic 20 shall now be discussed. The MAR register 18 is a 24-bit address register that is primarily used to address the system bus 19. It is comprised of an 8-bit, two-input multiplexer register on the low end and a 16-bit incrementor/decrementor on the high end. The multiplexed input into the lower eight bits is from either the control file 16 or the output of the address adder 20. The address adder 20 is an 8-bit two's complement adder unit that is primarily used for incrementing or decrementing the contents of the bus address register 18. The inputs to the address adder 20 are the low-order eight bits of the bus address register and the 8-bit shift register (MSR) 22. The shift register (MSR) 22 is an 8-bit universal shift register that can be loaded from the internal bus 14 and is capable of shifting left or right by one bit (i.e., open-end shift with zero-fill). The shift register functions as an input to the address adder 20 for incrementing or decrementing the bus address register 18. In addition, bit 0 of the shift register 22 can be loaded into the ALU carry-in flip-flop, which is useful during execution of the conversion instructions.

The bus output data register (OUR) 24 is a 16-bit data register that is used to transfer data onto the bus 19 data lines. It is loaded from the internal bus 14 with either the lower or upper byte or the entire 16-bit word. The bus input data register (INR) 26 is a 16-bit data register that is used to receive data from the bus 19 data lines. The contents of the input data register can be unloaded onto the internal bus 14.

The input function code register (BFCR) 28 is a 6-bit register that is used to store the function code when the CIP accepts any bus 19 input or output command. Subsequently, firmware examines the contents of the function code register 28 and executes the specified command. The input address bank register (INAD) 30 is an 8-bit register that is used to store the high-order eight memory address bits that are received over the bus 19 address lines. The high-order eight address bits contain the memory module address and are transmitted by the CPU 11 as the result of a so-called IOLD command or an output effective address function code. The low-order 16-bits of the memory address are received over the bus 19 data lines and are strobed into the INR register 26, forming the required 24-bit main memory address.

Figure 4:
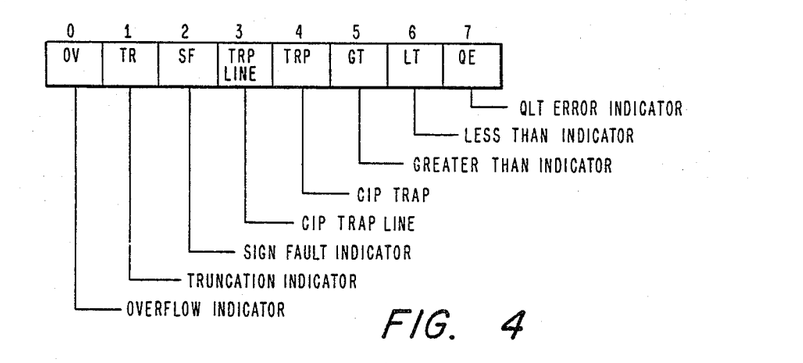
FIG. 4 illustrates the contents of one of the registers of the processor of the present invention.

The CIP indicator register 32 is an 8-bit storage register in which each bit can be individually set or reset. The indicator register bit configuration is shown in FIG. 4. The TRP and TRP line indicators are used by the CIP 13 for internal processing only and are not software visible. The TRP line (CIP trap line) indicator is used to inform the CPU 11 of an existing CIP trap condition and is transmitted over the bus 19 via the external trap signal. When set, the TRP (CIP trap) indicator allows the CIP to accept only input commands from the CPU.

The analysis register (AR) 34 is a 16-bit register that is primarily used to control microprogram branches (masked branches) and the over-punch byte encode/decode logic. This register is loaded with the entire 16-bit word from the internal bus 14. The microprogrammable switch register (MPSR) 36 is an 8-bit register in which each bit can be individually set or reset under microprogram control. Each bit within the MPSR register 36 is used as a flag to facilitate microprogramming (i.e., firmware can test each of the register bits and perform branch operations, depending on the test results). Some of these bits are also used to control certain CIP 13 hardware functions.

The ROS data register (RD) 38 is a 52-bit storage register that is used to store the control store output (firmware word) for the current firmware cycle. The microprogram return address register (RSRA) 40 is an 11-bit register that is loaded from the output of the next address generation (NAG) logic 42 and is used to store the microprogram return address when executing a firmware subroutine. The register file C address multiplexer/selector (RFCA) 31 is a 4-bit, 2-to-1 selector that is capable of addressing one of the 16 locations contained within register file C (i.e., control file) 16. This selector 31 selects a combination of the function code register 28 and either counter (1) 46 or selected bits of the ROS data register 38. The CIP counters 44 include three 8-bit up/down counters 46, 48 and 50 that are defined respectively as Counter 1 (CTR1), Counter 2

(CTR2), and Counter 3 (CTR3). These counters are loaded/unloaded via the internal bus 14. The contents of each counter are available for test and branch operations.

The overpunch byte decode/encode logic 52 includes two 512-location by 4-bit PROM chips that are used to decode/encode the contents of the analysis register (AR) 34. The byte being decoded is obtained from AR bits 1 through 7 and the digit begin encoded is obtained from AR bits 4 through 7. The decode/encode operation is accomplished by using AR bits 1 through 7 to address a specific PROM location. The contents of the specified PROM location are coded to conform to either: (1) the decoded digit, its sign, and its validity, or (2) the encoded overpunched byte. The MPSR 36-bit 4 specifies whether a decode or encode operation is performed, while MPSR bit 1 indicates the sign of the digit being encoded. Also, the output of the overpunched byte decode/encode logic is available on both halves of the internal bus 14.

The CIP test logic 54 selects one of 32 possible firmware test conditions for input to the next address generation logic 42. The true or false condition of the function being tested controls bit 50 of the control store next address field (i.e., sets or resets bit 50, depending on the condition of the tested function). The next address generation (NAG) logic 42 included in the CIP 13 uses one of the following five methods to generate the next firmware address: direct address, test and branch, masked branch, major branch, or subroutine return. Direct Address: this method is used when an unconditional branch is performed to the next sequential control store location. This is accomplished by using bits 41 through 51 of the control store word to form the next address. These bits comprise the next address (NA) field, which can directly address any of the available control store locations. Test and Branch: this method is used when a 2-way conditional branch (test condition satisfied) is performed within a firmware page (a firmware page being a 128-location segment within the control store). This is accomplished by using control store bits 41, 42, 43, 44 and 50 to select a test condition. Then, depending on the condition of the tested function, a branch is performed to one of two locations. The branch operation performed under this method is modulo 2 (i.e., the two possible branch addresses are two locations apart). The modulo 2 address is developed as follows: (1) if the test condition is satisifed, bit 9 of the address is set to a one, or (2) if the test condition is not satisfied, bit 9 of the address is set to a zero. Masked Branch: this method is normally used when branching on the contents of the analysis register (AR) 34 or certain other conditions, and provides branching to 2, 4, 8 or 16 locations within the same firmware page (a firmware page being a 128-location segment within the control store). Major Branch: this method is used when branching within a firmware page (128 words). A CPU/CIP interface routine uses this method to perform the required 16-way branch on the contents of the function code register 28. (INB Major Branch) and other control functions (EOP Major Branch). Subroutine Return: this method is used to return the firmware to the next odd or even control store location after execution of a firmware subroutine. The return address is obtained from the return address (RSRA) register 40, and must be stored in this register 40 prior to execution of the specified subroutine.

The internal bus 14 is 16-bits wide and is primarily used to transfer data between CIP registers, including locations within the register files. The internal bus receives data from several sources as shown in FIG. 2. Outputs from the internal bus 14 are fed to various registers within the CIP.

The parity checking logic 56 is coupled between the bus 19 and internal bus 14 and is used to check the parity of the incoming data. The parity generator logic 58, on the other hand, is used to generate the correct parity bit for transfer over the bus 19.

The bus request logic 60 and the bus response logic 62 are utilized for the purpose of enabling the CIP to gain access to the bus 19 and to respond to any requests to gain access to the CIP. Logic 60 and 62 are described in U.S. Pat. No. 3,993,891.

Figure 5:
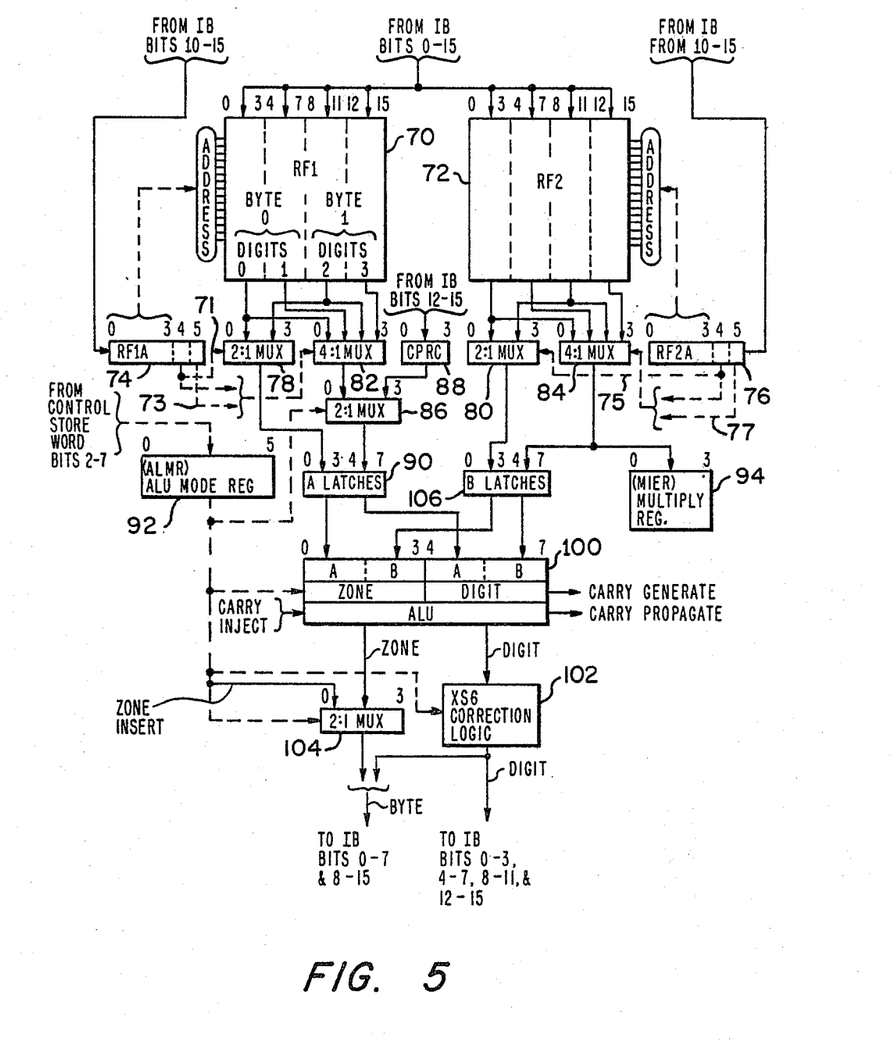
FIG. 5 is a detailed block diagram of the arithmetic unit of the present invention.

FIG. 5 is a major block diagram of the RALU 12, showing all major data transfer paths and control lines. The control lines are shown as dashed lines for ease of understanding its operation. For convenience, the description of the RALU is divided into seven areas: Operand Register Files, ALU Input Multiplexers and Latches, Arithmetic Logic Unit, XS6 Correction Logic, ALU Output Multiplexer, RALU Control Logic, and Miscellaneous RALU Registers. Operand register files RF1 70 and RF2 72 each consist of four RAM chips that are used as temporary storage for CIP operands. Addresses for each of the register files are supplied by two 6-bit address registers (RF1A 74 and RF2A 76, respectively). Bits 0 through 3 of each address register supply the address of the location within the associated register file, while the low order bits provide for byte and digit selection at the output of the register file. Both of these address registers can be incremented or decremented by 1, 2 or 4 (i.e, by digits, bytes, or words). As shown in FIG. 5, the output from each register file is fed to the inputs of two multiplexers (i.e., a pair of multiplexers for each register file) that select between zone and digit information. The selection is accomplished by bits 4 and 5 of the associated address register. Bit 4 selects whether bits 0 through 3 or 8 through 11 (from the register file) are fed to the output of the 2-to-1 multiplexers 78 or 80 respectively, while bit 5 selects the register file bits that comprise the digit being fed to the output of the 4-to-1 multiplexers 82 or 84 respectively.

The various registers and multiplexers are coupled for control by various control lines, shown as dotted lines, and including, for example, control lines 71, 73, 75 and 77. A third 2-to-1 multiplexer 86 is used to select whether the contents of the current product counter (CPRC) 88 or the digital from RF1 is delivered to the A latches 90. This multiplexer is controlled by the ALMR register 92. The ALU input latches, A latches 90 and B latches 106, receive both zone and digit information from the ALU input multiplexers, and latch the data into the register files during write operations. The outputs from the latch circuits feed the zone and digit information to the left and right sides of the ALU, respectively.

The current product counter (CPRC) is a 4-bit decimal up/down counter that is primarily used during execution of decimal multiply and divide operations. The multiplier register (MIER) 94 is a 4-bit binary up/down counter that is primarily used during decimal multiply and divide operations. The ALU mode control register (ALMR) 92 is a 6-bit control register that is used to control all ALU operations. The register file 1 address register (RF1A) 74 is a 6-bit address register that performs two functions: (1) provides addresses for register file 1 (70), and (2) controls two of the three ALU input multiplexers associated with register file 1. The register file 2 address register (RF2A) 76 is a 6-bit address register that performs two functions: (1) provides addresses for register file 2 (72), and (2) controls the ALU input multiplexers associated with register file 2. All arithmetic logic unit (ALU) 100 operations are performed in either the decimal or binary mode. Decimal mode is used when operating with decimal digit information, while binary mode is used for byte (Alpha) operations. Both modes of operation also control the excess 6 (XS6) correction logic 102 and the inputs to the carry flip-flop. In decimal mode, the carry flip-flop is loaded with the carry from the low-order four bits of the ALU, while in binary mode, it is loaded with the carry from the eight bits of the ALU for subsequent arithmetic operations. The carry flip-flop is loaded under microprogram control when a carry must be propagated for subsequent operations. In addition, the carry flip-flop can be loaded from the MSR register, and set or reset under microprogram control.

The XS6 correction logic 102 has one 32-bit by 8-bit PROM chip and the associated control logic to correct the high-order three bits from the digit output of the ALU. XS6 correction is performed if: (1) the ALU is in decimal add mode and a decimal carry is encountered or the digit output of the ALU 100 is greater than 9, and (2) in the decimal subtract mode, if a borrow is encountered (i.e., absence of a carry from the digit portion of the adder). The PROM chip has five address lines. Three of these lines consist of the three highorder bits from the digit output of the ALU, while the other two address lines indicate the type of operation being performed (i.e., add correction, subtract correction, or no correction). The coded contents of the PROM chip are the three high-order corrected bits of the digit, the corrected decimal carry, and the digit less than 2 condition.

The ALU output multiplexer 104 selects between the upper four bits of the adder output and the corrected decimal zone bits for delivery to the internal bus. The configuration of the zone bits (for decimal mode) depends on whether ASCII or EBCDIC data is being used (i.e., if ASCII data is being used, the zone bits are forced to a value of 3; if EBCDIC data is being used, the zone bits are forced to a value of F).

The RALU controls consist of registers RF1A 74, RF2A 76, and ALMR 92 plus various RALU related microinstructions. In addition, the ALU carry flip-flop is under microprogram control. The carry flip-flop can be precleared or preset, (as required), by the respective microinstructions, and can be loaded from: (1) the 4-bit digit carry for decimal operations, (2) the 8-bit binary carry for binary operations, or (3) bit 0 of the MSR register 22 during execution of conversion instructions. the ALMR register 92, which controls all ALU operations, is loaded from control store bits 2 through 7. Bit 0 specifies whether the ALU operates in decimal or binary mode; i.e., whether the carry out of the ALU is from bit 4 (digit carry) or bit 0 (binary carry). Bit 0 also controls both the ALU correction (XS6) for decimal operations and the ALU output multiplexer 104; the multiplexer determines whether the high-order four bits of the ALU or the forced zone bits are gated to the internal bus 14. Bits 1, 2 and 3 are used to control operations within the ALU. Bit 4 specifies whether the zone bits are forced to a value of 3 or F (i.e., for ASCII data, the zone bits are forced to a value of 3; for EDCDIC data, the zone bits are forced to a value of F). Bit 5 specifies whether the selected digit from register file 1 or the contents of the current product counter 88 are gated to the latches 90 associated with the left side of the ALU. Register RF1A provides the address and controls for register file 1 and the associated ALU input multiplexers. Register RF2A provides the addresses and controls for register file 2 and the associated ALU input multiplexers.

The control file 16 is divided into two sections: the upper section (bits 0 through 7) and the lower section (bits 8 through 23). Each section of the control file can be loaded as follows: RFC lower from the internal bus (bits 0 through 15), RFC upper from the internal bus (bits 0 through 7), RFC lower from the internal bus (bits 0 through 15), and RFC upper from the bus address register 18 (bits 0 through 7). The functions used to implement the above operations have an address assoociated with them, which address corresponds to the RFC 16 location being loaded. This address originates from either the function code register 28 or the control store 10. Thus, the RFC address is directly related to the type of data being delivered by the CPU 11, or as indicated by the function code.

As noted hereinabove, the RALU 12 of the processor of the present invention includes correction logic called excess 6 (XS6) correction logic 102 as shown in FIG. 5. The excess 6 correction technique is used in data processing systems when it is desired to perform binary coded decimal arithmetic with a binary arithmetic unit. This technique is used to compensate for the use of the binary RALU as shown in FIG. 5. A discussion of binary coded decimal number systems and binary number systems may be found in the book entitled "Digital Computer Design Fundamentals," by Yaohan Chu, McGraw-Hill Book Company, Inc., 1962. By way of example, the addition of two numbers, say 8 and 5, which in binary coded decimal are represented as 1000 and 0101 respectively, produce the result 13 which in binary form is represented as 1101. However, where the result must be in binary coded decimal, the number 13 would be represented as 0001 0011, where the first block of 1's and 0's represents the 1 in 13 and whereas the second block represents the 3 in 13.

Figure 6:
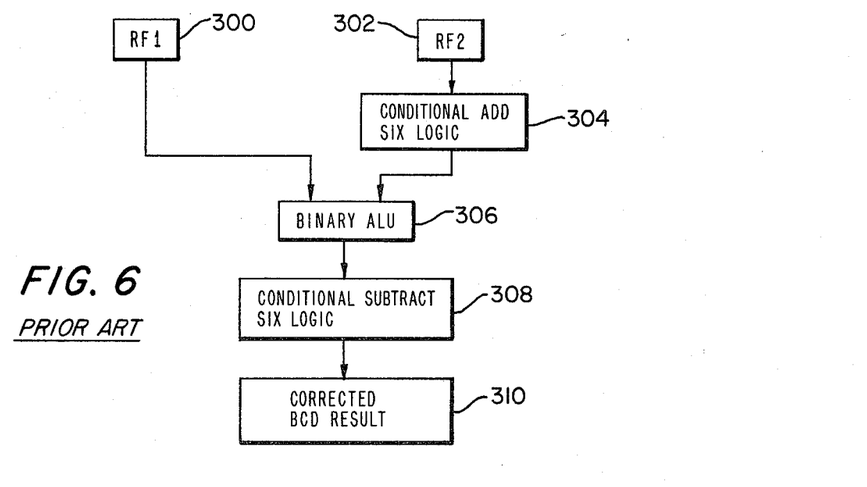
FIG. 6 is a block diagram of apparatus of the prior art.

In prior art systems, the correction has been made by use of the excess 6 correction technique using special logic which is enabled in response to various test conditions, including whether or not there was a carry during the arithmetic operation and whether there is an addition or a subtraction which is taking place. In essence, in such prior art systems, the excess 6 correction is made by adding six to one of the operands and subtracting six from the result under control of the carry and type of operation. FIG. 6 illustrates such a prior art system. The first operand, OP1, in register 300 is shown coupled directly to one input of the binary ALU 306. The other operand, OP2, in register 302 is coupled to the input of conditional add six logic 304. Dependent on the above-noted test conditions, the logic 304 is enabled and thus OP2, as conditioned by the add six, is received at the other input of binary ALU 306. The result produced by ALU 306 is received by conditional subtract six logic 308 which is enabled, in response to such test conditions, to produce the correct result as shown in block 310. As can be seen, logic 304 and logic 308, both of which may require three or more so-called electronic chips, are an increased burden to the system.

Figure 7:
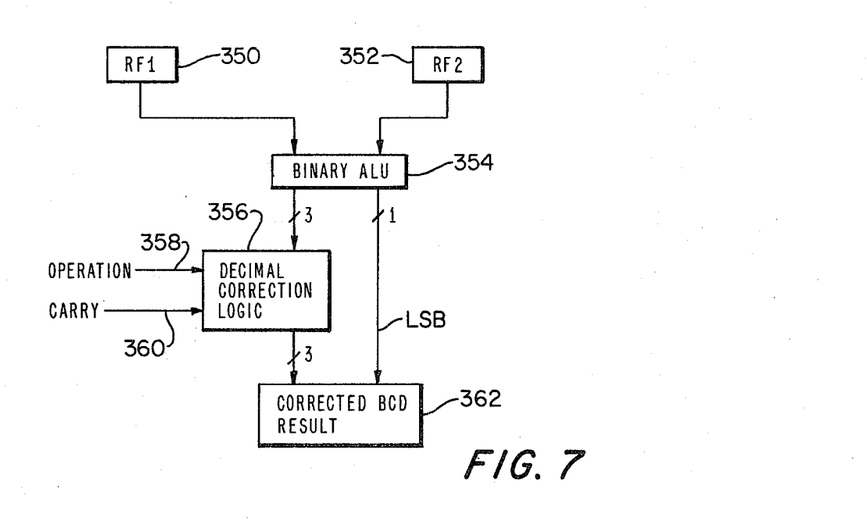
FIG. 7 is a simplified block diagram of the apparatus of the present invention.
Figure 8:
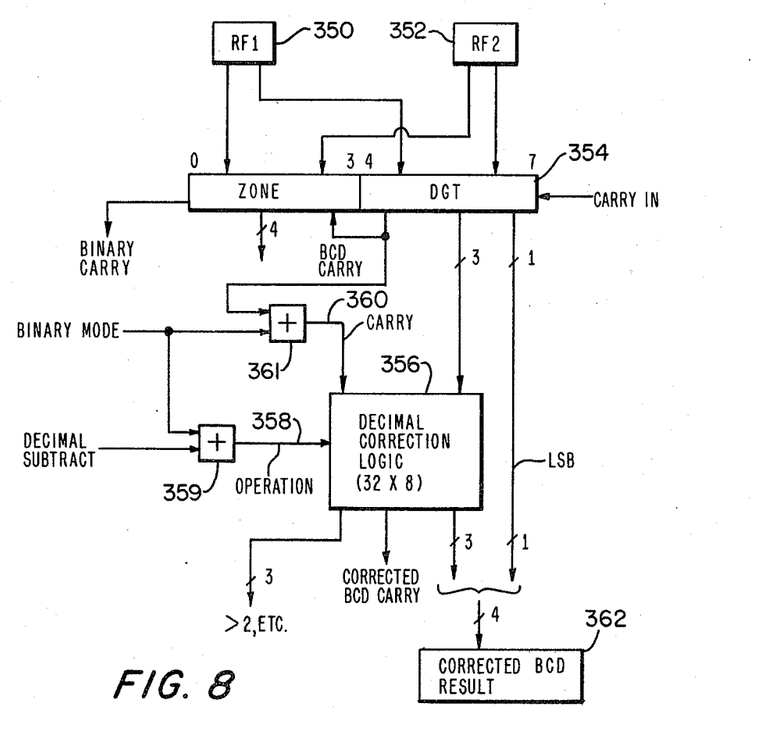
FIG. 8 is a more detailed block diagram of the apparatus of the present invention.
Figure 9:
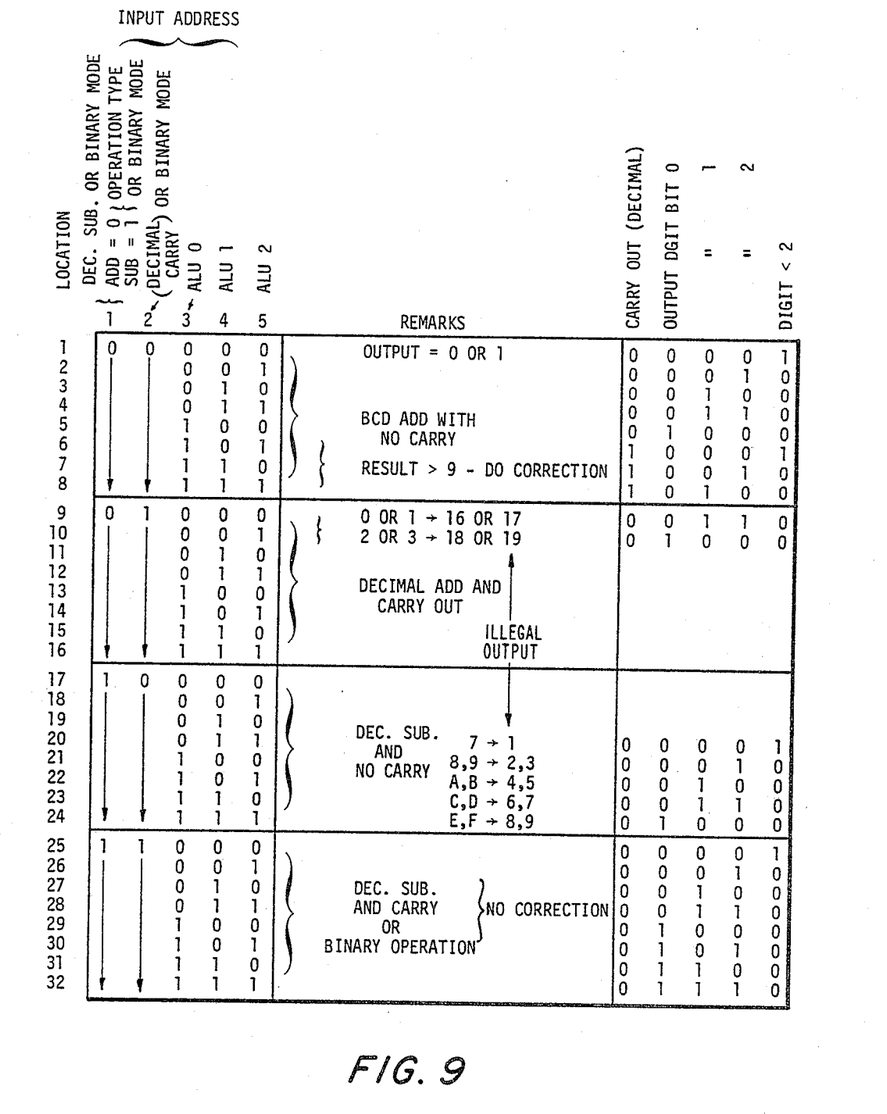
FIG. 9 depicts the decimal correction logic of the apparatus of the present invention.

The apparatus of the present invention also utilizes the excess 6 correction technique but with less logic as shown in the simplified diagram of FIG. 7 and in more detail in FIG. 8. Both operands RF1 (350) and RF2 (352) are received by the inputs of the binary ALU 354, i.e., RALU 12. Binary ALU 354 is shown in FIG. 8 to include the zone and digit sections, each section having four bits of information storage. By the present invention, only the operand inputs to the digit section are used. The zone section output is used to provide a binary carry output, and in general, use of the zone section is used only for binary numbers and not the single digit BCD numbers from RF1 and RF2. The conditional add logic 304 of FIG. 6 is not used. A portion of the digit section output of ALU 354 is coupled to decimal correction logic 356 which may comprise a single memory chip such as a programmable read only memory (PROM) or a fixed read only memory (ROM). Logic 356 is also under the control of the two control inputs 358 and 360 which are coupled to receive respectively the operation code and the carry condition. The corrected BCD result 362 is received at the output (3 bits) of logic 356 and from the digit section (1 bit) of ALU 354. The configuration, that is, the contents of the logic or memory 356 is shown in FIG. 9. FIG. 8 illustrates the details of such apparatus of FIG. 7, particularly with respect to the carry input 360 and the operation input 358 to logic 356. By use of OR gates 359 and 361, if in binary mode, then both the carry and operation inputs to logic 356 are enabled. In addition, if there is a BCD carry, then via OR gate 361, carry input 360 is enabled. If there is a decimal subtract operation, then via OR gate 359, operation input 358 is enabled.

An example of the operation of the excess 6 correction technique shall now be given for (1) adding of 8 and 5, and (2) subtracting 5 from 8. The binary coded decimal (BCD) representation for 8 is 1000 and for 5 is 0101. Adding BCD 1000 and 0101 gives binary 1101 or 13. To achieve the answer in BCD, one first unconditionally adds six to one of the numbers, say 0101. Thus 0110 (i.e., 6) added to 0101 (i.e., 5) gives 1011 BCD. This number, BCD 1011 is then added to 1000 to give binary 0011 with a carry. Since there is a carry no further arithmetic process is necessary and the BCD result is 0001 0011, i.e., the carry (left four bits) and the result without the carry (right four bits). If there was no carry, then 6 would have been subtracted, by adding the 2's complement of 6, from the result to give the answer. For example, 5+3 would result in no carry after the addition of 5+3+6. Thus, from the answer to such addition, 6 would be subtracted giving 1000 with a carry which carry would not be used.

In subtracting 5 from 8, there would be no addition of 6 to either number. Rather the result would be inspected for a carry. By this example, the result would be 0011 with a carry which would directly give the answer 0011 (i.e., 3) with the carry not being used in the result. On the other hand, if there was no carry, then 6 would have been subtracted from the result of the subtraction. For example, subtraction of 8 from 5, i.e., 8 from 15 with a borrow would give 1101 without a carry. A 6 would then be subtracted from such result 1101 by adding the 2's complement of 6 (i.e., 1010) thereby giving a result of 0111 (i.e., 7) with the carry not being used.

Thus in summary, when adding, a 6 is unconditionally added to one operand, whereas when subtracting, there is unconditionally no such adding of a 6. Thus, adding a 6 is conditional only on the type of operation. A 6 is subtracted from the result of such initial addition of the two operands plus the addition of 6, or the result of the subtraction of the two operands, depending on whether or not there is a carry in such result. If there is a carry, then the desired result in BCD form is achieved. If there is no carry, then a subtract 6 operation is commenced independent of the type of operation, i.e., addition or subtraction.

It can be seen from the above that such excess 6 correction technique of the prior art as shown in FIG. 6 requires a significant number of operations and associated logic. By the present invention the result is achieved by use of a memory which is addressed by indicia indicative of the type of operation, whether there is a carry and a portion of the result of the addition as shown in FIGS. 7 and 8 by the binary ALU 354.

Referring to FIG. 9, the logic or memory 356 is shown. The memory of FIG. 9 may include 32 locations addressable by 32 different input addresses. Depending upon the location addressed, a different output is produced. The input addresses are shown in the left column with remarks in the center column. The actual memory contents of logic 356 is shown in the right column, which shows the respective outputs produced if a respective location is addressed. The output from logic 356 includes the corrected BCD carry output and the three most significant bits 0, 1 and 2. The least significant bit is received directly from the binary ALU 354. The output may also include other parameters such as, for example, indicia as to whether the digit is less than 2, as shown in FIG. 9, and other indicia, of which up to three lines therefor are shown in FIG. 8. Bit spacing permitting in each location (usually at least 8 bits are available in each memory location), other parameters may thus be included in each output.

Each of such locations is addressed by use of an input address which comprises five bits, three of which (ALU 0-2) for the most significant bits received from the output of binary ALU 354. One of the other inputs of the input address indicates the operation type, a binary 0 being representative of a subtract operation. The other input indicates whether there was a BCD binary carry from binary ALU 354.

The remarks column indicates for example with respect to the first eight locations that the operation was a BCD add with no carry, or for the last eight locations that there was a decimal subtract operation with a carry or that there was a binary operation. For locations 11 through 19, there was no legal output. Thus, such locations need not be used. If used the output could be set to indicate all binary ones or all binary zeros. Other notations indicate, for example, with respect to location 1, that the output is either a 0 or a 1 depending upon the binary level of the least significant bit received from binary ALU 354.

Having described the invention, what is claimed as new and novel and for which it is desired to secure Letters Patent is:

1. Apparatus for performing binary coded decimal arithmetic by use of an arithmetic logic unit designed for performing binary arithmetic, said apparatus comprising:

A. a binary arithmetic logic unit for performing binary arithmetic on a first operand and a second operand and thereby producing a result, wherein said first and second operands are in binary coded decimal form;

B. first means for determining whether the arithmetic operation to be performed by said unit is an add operation or a subtract operation;
C. second means, coupled with said logic unit, for determining whether the result of said arithmetic operation on said first operand and said second operand has produced a carry output; and
D. correction logic, responsive to the result produced by said unit and resonsive to said first means and said second means for determining, for providing a corrected result of the result produced by said unit, which corrected result is a value in binary coded decimal form, said correction logic including a plurality of storage locations, each of said locations including stored therein a said corrected result corresponding to the result produced by said unit and the operation and possible carry output indicated by said first and second means for determining.

2. Apparatus as in claim 1 further comprising means for coupling said result, and the indication of said first and second means for determining to address one of said locations in said correction logic.

3. Apparatus as in claim 2 wherein said result generated by said unit comprises four bits of information, one of said bits being the least significant bit, and wherein said means for coupling said result couples each of said four bits except said least significant bit.

4. Apparatus as in claim 2 wherein each of said locations includes stored therein further indicia relating to the corrected result.

5. Apparatus as in claim 4 wherein said indicia includes an indication as to whether the result is equal to, greater than or less than a predetermined number.

6. Apparatus as in claim 2 further comprising:
A. means for indicating whether said apparatus is in the binary mode; and
B. means, included in said correction logic and responsive to said means for indicating, for providing a result from said logic.

7. Apparatus comprising:
A. first means for receiving a first operand in binary coded decimal form;
B. second means for receiving a second operand in binary coded decimal form;
C. a binary arithmetic logic unit, coupled with said first and second means for receiving, for performing binary arithmetic, including add and subtract operations, on said first and second operands, the result of which is a value which is not in binary coded decimal form;
D. first means for indicating whether the type of arithmetic operation to be performed by said unit is an add operation or a subtract operation;
E. second means for indicating whether the result of said arithmetic operation has produced a carry output; and
F. means, coupled with said logic unit and said first and second means for indicating, for correcting the result produced by said unit such that said result is in binary coded decimal form, said means for correcting responsive to said result produced by said unit, and the indications of said first and second means for indicating, said means for correcting including
 1. storage means having a plurality of storage locations, each of said locations having stored therein a predetermined corrected result,
 2. means, coupled with said storage means, for addressing said storage means,
 3. means for coupling said first and second means for indicating and said result produced by said unit to said means for addressing, and
 4. means, coupled with said storage means and responsive to the addressing of said storage means, for fetching the contents of the addressed one of said storage locations, wherein said predetermined corrected result of said contents of said addressed one of said storage locations includes a value in binary coded decimal form.

8. Apparatus as in claim 7 wherein only a portion of the result produced by said unit is used in addressing said storage means by means of said means for addressing.

9. Apparatus as in claim 8 wherein said predetermined corrected result includes four bits of information and wherein the least significant bit of said result produced by said unit is used directly in producing said predetermined corrected result.

* * * * *